United States Patent [19]
Greider

[11] 3,898,923
[45] Aug. 12, 1975

[54] SAFETY TABLE FOR A SKINNING MACHINE

[75] Inventor: Charles Austin Greider, Des Moines, Iowa

[73] Assignee: Townsend Engineering Company, Des Moines, Iowa

[22] Filed: Nov. 29, 1973

[21] Appl. No.: 420,266

[52] U.S. Cl. .................. 99/589; 17/62; 83/443; 99/540; 108/4; 108/6
[51] Int. Cl. ............................................. A22b 5/16
[58] Field of Search ............ 99/589, 540, 541, 588, 99/593; 83/4, 443, 445; 17/62, 21; 108/4, 6

[56] References Cited
UNITED STATES PATENTS
3,094,739  6/1963  Erikson.................................. 17/62

*Primary Examiner*—John W. Huckert
*Assistant Examiner*—Charles Gorenstein
*Attorney, Agent, or Firm*—Zarley, McKee, Thomte & Voorhees

[57] ABSTRACT

A safety table for a skinning machine is disclosed, the skinning machine comprising a frame means having a driven roll rotatably mounted thereon and a skinning blade closely positioned thereto. The safety table is mounted on the frame means and has a horizontally disposed table portion adjacent its forward end which is disposed in a plane above the driven roll. An arcuate table portion extends downwardly and rearwardly from the rearward end of the horizontally disposed table portion and terminates adjacent the driven roll and skinning blade. The safety table is horizontal and vertically selectively adjustable. The safety table permits the product to be moved into contact with the skinning blade while impeding the operator's arm and hand from engaging the skinning blade and driven roll if the operator's hand or arm should slip rearwardly.

1 Claim, 6 Drawing Figures

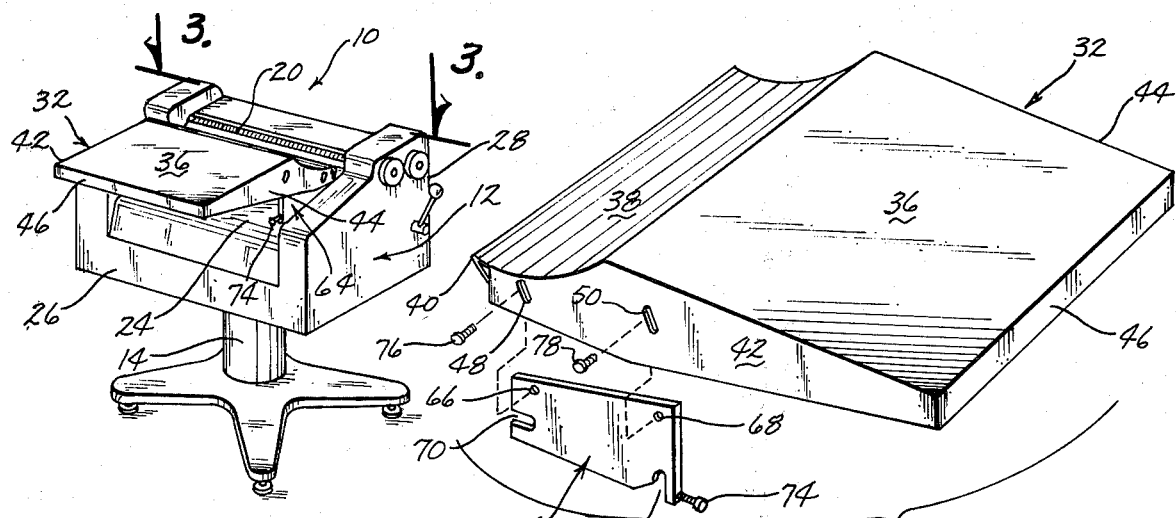
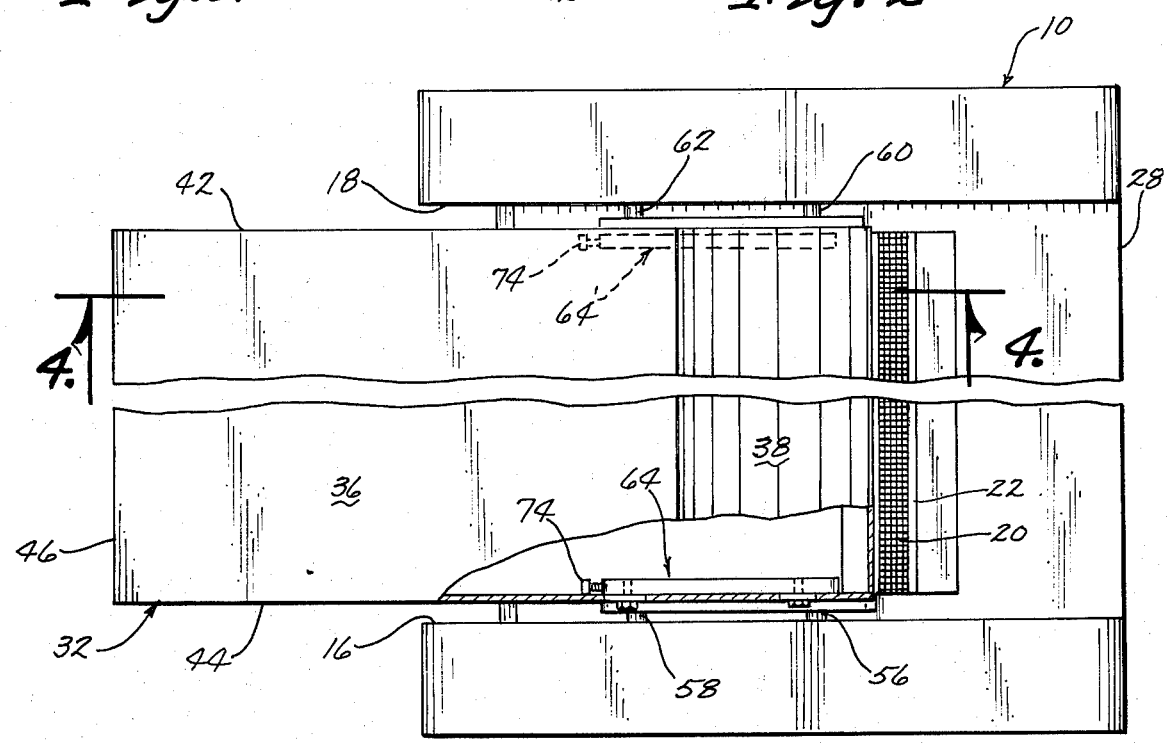
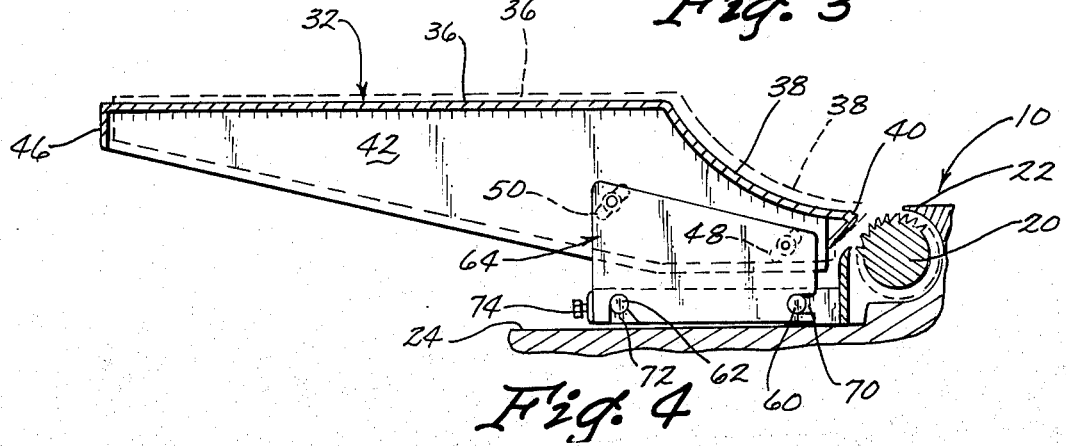

SAFETY TABLE FOR A SKINNING MACHINE

BACKGROUND OF THE INVENTION

Skinning machines such as those described in Reissue Pat. No. 23,222; U.S. Pat. No. 2,522,728; and U.S. Pat. No. 2,912,027 are employed to removed the skins from meat products such as pork jowls or the like. Generally speaking, the skinning machines include a driven toothed roll rotatably mounted on a frame means adjacent one end of a feed table and a pressure shoe which extends around a portion of the driven roll. The previous machines also generally included a skinning blade which extended from the pressure shoe adapted to sever the skin from the meat product as the meat product is moved thereby. In the skinning operation of the previous machines, the machine operator manually slides the meat product over the feed tray or feed table into engagement with the rotating driven roll and the skinning blade. Accidents frequently occur upon the operator's hand or hands slipping and moving into contact with the rotating driven roll and the skinning blade.

Therefore, it is a principal object of this invention to provide a safety table for a skinning machine.

A further object of the invention is to provide a safety table for a skinning machine which impedes the operator's hand or hands from moving into contact with the skinning blade.

A further object of the invention is to provide a safety table for a skinning machine which is selectively adjustably mounted thereon.

A further object of the invention is to provide a safety table for a skinning machine including a horizontally disposed portion and a downwardly and rearwardly extending portion.

A further object of the invention is to provide a safety table for a skinning machine which prevents injury to the machine operator.

A further object of the invention is to provide a safety table for a skinning machine which does not interfere with the normal operation of the machine.

A further object of the invention is to provide a safety table for a skinning machine which is economical of manufacture and durable in use.

These and other objects will be apparent to those skilled in the art.

BRIEF DESCRIPTION OF THE DRAWINGS

This invention consists in the construction, arrangements and combination of the various parts of the device, whereby the objects contemplated are attained as hereinafter more fully set forth, specifically pointed out in the claims, and illustrated in the accompanying drawings, in which:

FIG. 1 is a perspective view of a skinning machine having the safety table of this invention mounted thereon:

FIG. 2 is a perspective view of the safety table of this invention:

FIG. 3 is a partial sectional view seen on lines 3 — 3 of FIG. 1 with portions thereof cut-away to more fully illustrate the invention:

FIG. 4 is a sectional view seen on lines 4 — 4 of FIG. 3, the broken lines indicating the alternate position to which the safety table may be moved:

DESCRIPTION OF THE PREFERRED EMBODIMENT

Figure 5:
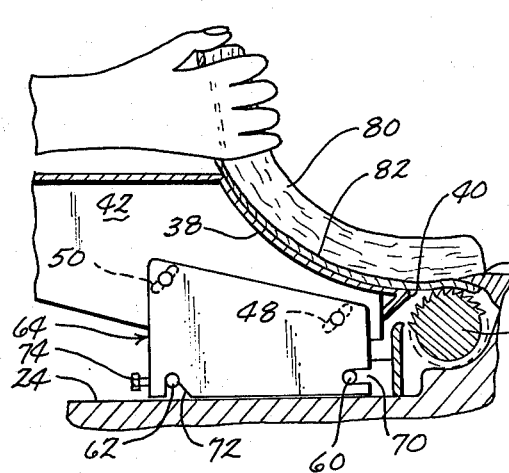
FIG. 5 is a sectional view similar to FIG. 4 but which illustrates the manner in which the product is moved into engagement with the skinning blade.

Referring to the drawings, the numeral 10 refers generally to a skinning machine of the general type disclosed in the patents previously identified. Machine 10 generally comprises a frame means 12 supported by a pedestal 14. For purposes of description, frame means 12 will be described as including oppositely disposed side walls 16 and 18.

A driven roll 20 is horizontally rotatably mounted on the frame means 12 and extends between the side walls 16 and 18 as seen in the drawings. The numeral 22 refers to a skinning blade which is closely positioned adjacent the periphery of the driven roll 20 adapted to engage the product to be skinned so as to sever the skin or membrane therefrom. In conventional skinning machines, a stationary feed tray or table 24 is positioned at one side of the driven roll and skinning blade for moving the product into engagement with the driven roll and skinning blade. For purposes of description, the frame means 12 will be described as having a forward end 26 and a rearward end 28.

Figure 6:
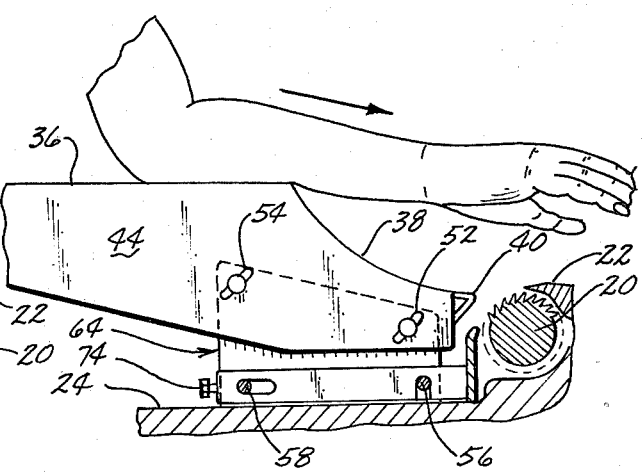
FIG. 6 is a view similar to FIG. 5 illustrating the manner in which the safety table prevents the operator's hand from engaging the skinning blade.

The safety table illustrated in FIG. 1 – 6 will be generally referred to by the reference numeral 32. Safety blade 32 generally comprises a horizontally disposed table portion 36 having an arcuate table portion 38 extending downwardly and rearwardly from the rearward end thereof. As seen in FIG. 6, the forward edge of arcuate table portion 38 is bent back upon itself at 40. Safety table 32 also comprises a pair of downwardly extending side walls 42 and 44 and a forward wall 46. Side wall 42 is provided with a pair of inclined slots 48 and 50 formed therein while side wall 44 is provided with a pair of inclined slots 52 and 54 formed therein.

As seen in FIG. 3, a pair of pins 56 and 58 extend inwardly from side wall 16 while a pair of pins 60 and 62 extend inwardly from side wall 18. The numeral 64 refers to a mounting bracket having a pair of spaced apart threaded openings 66 and 68 formed in the upper end thereof and a pair of slots 70 and 72 formed in the rearward and bottom ends respectively. A bolt 74 threadably extends into the forward end thereof adapted to move into the slot 72. The table 32 is secured to the mounting bracket 64 by means of the bolts 76 and 78 extending through the slots 48 and 50 and being received by the threaded openings 66 and 68. The numeral 64' refers to a mounting plate secured to the other side of the table 32 in an identical manner to that just described. Mounting plate 64 is secured to the skinning machine 10 as seen in FIG. 4. In FIG. 4, it can be seen that the slot 70 receives the pin 60 while the slot 72 receives the pin 62. The bolt 74 is then threadably tightened so that the inner end thereof engages the pin 62 to positively maintain the mounting plate and the table on the skinning machine. The mounting bracket 64' is secured to the pins 56 and 58 in an identical fashion to that just described.

In operation, the table 32 is mounted on the skinning machine in the manner just described. The table 32 may be selectively moved upwardly and rearwardly or downwardly and forwardly with respect to the roll 20 by simply loosening the bolts which are received in the slots 48, 50, 52, and 54. FIG. 5 illustrates the manner in which the meat product 80 is moved into engagement with the roll 20 and skinning blade 22. The meat is moved downwardly over the arcuate table portion 38 so that the skin 82 is closely positioned thereto. As seen in FIG. 5, the arcuate shape of the arcuate table portion 38 causes the meat product to be moved into engagement with the driven roll 20 and skinning blade 22 so that the skin 82 is removed therefrom. If the operator's hand or arm should slip as illustrated in FIG. 6, the operator's hand will be prevented from engaging the roll and blade since the horizontally disposed table portion 36 tends to cause the operator's hand to pass over the blade and roll in a spaced relationship. This is caused by the fact that the horizontally disposed table portion 36 is disposed in a plane above the roll and blade and the engagement of the operator's arm with the table portion 36 prevents the operator's hand from moving downwardly into engagement with the blades as could possibly occur if the safety table were not utilized. It is evident that a novel safety table has been provided which not only prevents injury to the machine operator but which also assists in efficiency removing the skin from the meat product.

Thus it can be seen that a safety table has been provided for a skinning machine which impedes the machine operator from injuring his hand or arm. A safety table has also been provided which does not interfere with the normal skinning operation of the machine which also aids in skinning the meat product. Thus it can be seen that the safety table of this invention accomplishes at least all of its stated objectives.

I claim:
1. In combination,
a skinning machine having a frame means with a top portion, and forward and rearward ends, opposite sides, and a skinning blade mounted on said frame means,
a safety table means secured to said skinning machine adjacent the forward end of said skinning machine,
said safety table means comprising a forward table portion disposed in a plane above said skinning blade and a rearward table portion extending downwardly and rearwardly from the rearward end of said forward table portion towards said skinning blade, said rearward table portion being arcuate, said safety table having opposite sides,
mounting means securing said safety table means to said skinning machine,
said skinning machine having first and second pairs of spaced apart pins extending horizontally inwardly from opposite sides thereof towards said safety table means,
said mounting means comprising a first mounting bracket secured to one side of said safety table means and a second mounting bracket secured to the other side of said safety table means,
said first mounting bracket being selectively detachably secured to said first pair of pins,
said second mounting bracket being selectively detachably secured to said second pair of pins.

* * * * *